(12) United States Patent
Venkataramanujam (10) Patent No.: US 8,001,107 B2
(45) Date of Patent: Aug. 16, 2011

(54) LANDING PAGE MAKER

(75) Inventor: Perialwar Venkataramanujam, Darien, IL (US)

(73) Assignee: CBS Systems Corp., Darien, IL (US)

( * ) Notice: Subject to any disclaimer, the term of this patent is extended or adjusted under 35 U.S.C. 154(b) by 431 days.

(21) Appl. No.: 12/228,953

(22) Filed: Aug. 18, 2008

(65) Prior Publication Data

US 2010/0042635 A1 Feb. 18, 2010

(51) Int. Cl.
*G06F 17/30* (2006.01)
(52) U.S. Cl. ............... 707/709; 707/713; 707/736
(58) Field of Classification Search ........... 707/999.002, 707/709, 706, 713, 736, 999.1, 780, 723; 715/234, 253, 277; 709/203, 219, 224, 225; 705/26.1; 706/47
See application file for complete search history.

(56) References Cited

U.S. PATENT DOCUMENTS

| | | | | |
|---|---|---|---|---|
| 7,644,121 B2 * | 1/2010 | Swanson et al. | ............... | 709/203 |
| 7,739,594 B2 * | 6/2010 | Vasilik | ............... | 715/277 |
| 7,792,858 B2 * | 9/2010 | Tang et al. | ............... | 707/780 |
| 7,831,658 B2 * | 11/2010 | Khopkar et al. | ............... | 709/203 |
| 7,844,894 B2 * | 11/2010 | Khopkar et al. | ............... | 715/234 |
| 7,848,949 B1 * | 12/2010 | Delanders et al. | ............... | 705/14.49 |
| 2007/0168465 A1 * | 7/2007 | Toppenberg et al. | ............... | 709/218 |
| 2009/0094137 A1 * | 4/2009 | Toppenberg et al. | ............... | 705/27 |
| 2010/0114864 A1 * | 5/2010 | Agam et al. | ............... | 707/709 |

* cited by examiner

*Primary Examiner* — Jean M Corrielus
(74) *Attorney, Agent, or Firm* — Louis Ventre, Jr.

(57) ABSTRACT

The present invention relates to a method, system and computer program product for managing one or more landing pages. The method, system and computer program product enables creation of a landing page by using one or more pre-coded templates. The created landing pages are coded by using various Dynamic Link Libraries (DLLs) and web services. Further, the method, system and computer program product enables dynamic updating of the created landing pages with the content stored in one or more databases.

10 Claims, 6 Drawing Sheets

LANDING PAGE MAKER

FIELD OF THE INVENTION

The present invention relates, in general, to the field of landing pages, and more specifically, to a method and system for creating and managing static as well as dynamic landing pages.

BACKGROUND

The past few years have witnessed an increase in the use of the Internet for various purposes including sharing of information and online sale and purchase of products and services. The Internet and its use have become a revenue model for various companies today. The revenue generated by these companies depends on the services provided or facilitated by the Internet. For example, revenue earned from online selling of products is growing exponentially. Therefore, more and more companies are launching their own websites to attract more customers and to market their products.

Typically, a company advertises its product catalogue through its website and receives orders for them or processes queries for information about their products. The main concern for a company planning to launch a website is the design of the landing pages. Landing pages are the web pages that appear when a potential customer clicks on an advertisement or a search engine result link. The creation and operation of the landing pages should be customizable and flexible. Further, the maintenance and management of the created landing pages should be easy and should not involve a considerable amount of time and effort.

Most companies employ third-party firms or separate divisions within the company to create and manage the landing pages for their websites, either because the employees of the company lack the knowledge or technical know-how, or the budget and workforce needed for designing, creating or maintaining the landing pages is too large. Generally, a representative of a company informs a web designer about the company's products and services and associated concepts. The web designer then creates the landing pages of the company's website based on the information provided by the representative. Due to this communication of the information by the company representative to the web designer, the turn-around time for the creation of the landing pages increases considerably. Further, it has been observed that generally there is a difference between the understanding of the web designer and the explanation of the company representative relating to the design and layout of the landing pages. Further, even after the landing page is created by the web designer, the company needs the web designer to make changes to the landing page if the information relating to the landing page changes. This involves an additional amount of time and money for the company, especially if the changes are to be made on a periodic basis.

Alternatively, online page-making websites are available that provide various resources and tools to users to create landing pages. These websites provide various templates for quick creation of web pages. Users can select from the available templates and write the content according to their requirements. However, the landing pages created using these web resources and tools are generally similar and do not provide the customizability and configurability that comes from creating specialized business solutions for landing pages. Further, to change the content of a landing page, a user needs to re-create the entire landing page by visiting the online page-making website again. This involves an additional amount of time, effort and cost for the users.

In light of the foregoing, there is a need for a method and system for creating and managing landing pages without the involvement of web designers and online page-making websites. The method and system preferably should enable a user to change the content of the landing page without needing to re-create the entire landing page. Further, the process to create a landing page preferably should be simple for a user to implement, even if he does not have technical knowledge about landing pages.

SUMMARY

An object of the present invention is to provide a method, system and computer program product for managing landing pages. The invention eliminates the need for engaging web designers or online page-making websites to create and manage landing pages. The invention enables creation of landing pages using one or more pre-coded templates (i.e., customized with company information), and subsequently coding them with one or more Dynamic Link Libraries (DLLs) and web services. Additionally, the invention enables dynamic update of the content of the created landing pages without the need to re-create the landing pages.

In one embodiment, a method for managing landing pages is provided. The method includes creation of a landing page by using one or more pre-coded templates. The method also includes coding of the created landing page by using various DLLs and web services. Further, the method includes dynamic update of the created landing page with content from one or more databases.

In another embodiment, a system for managing landing pages is provided. The system includes a landing page creator that is configured to create a landing page by using one or more pre-coded templates. The landing page creator is also configured to dynamically update the created landing page with content stored in one or more databases. The system also includes a configuration section that is configured to code the created landing page by using various DLLs and web services.

In yet another embodiment, a computer program product for use with a computer that has a computer-readable program code for managing landing pages is provided. The computer program product includes program instructions for creating a landing page by using one or more pre-coded templates. The computer program product also includes program instructions for coding the created landing page by using various DLLs and web services. Further, the computer program product includes program instructions for dynamically updating the created landing page with content from one or more databases.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DETAILED DESCRIPTION

While the embodiments of the invention have been described, the invention is not limited to these embodiments only. A number of changes and modifications can be considered without moving away from the scope of the invention, as set forth in the claims.

Figure 1:
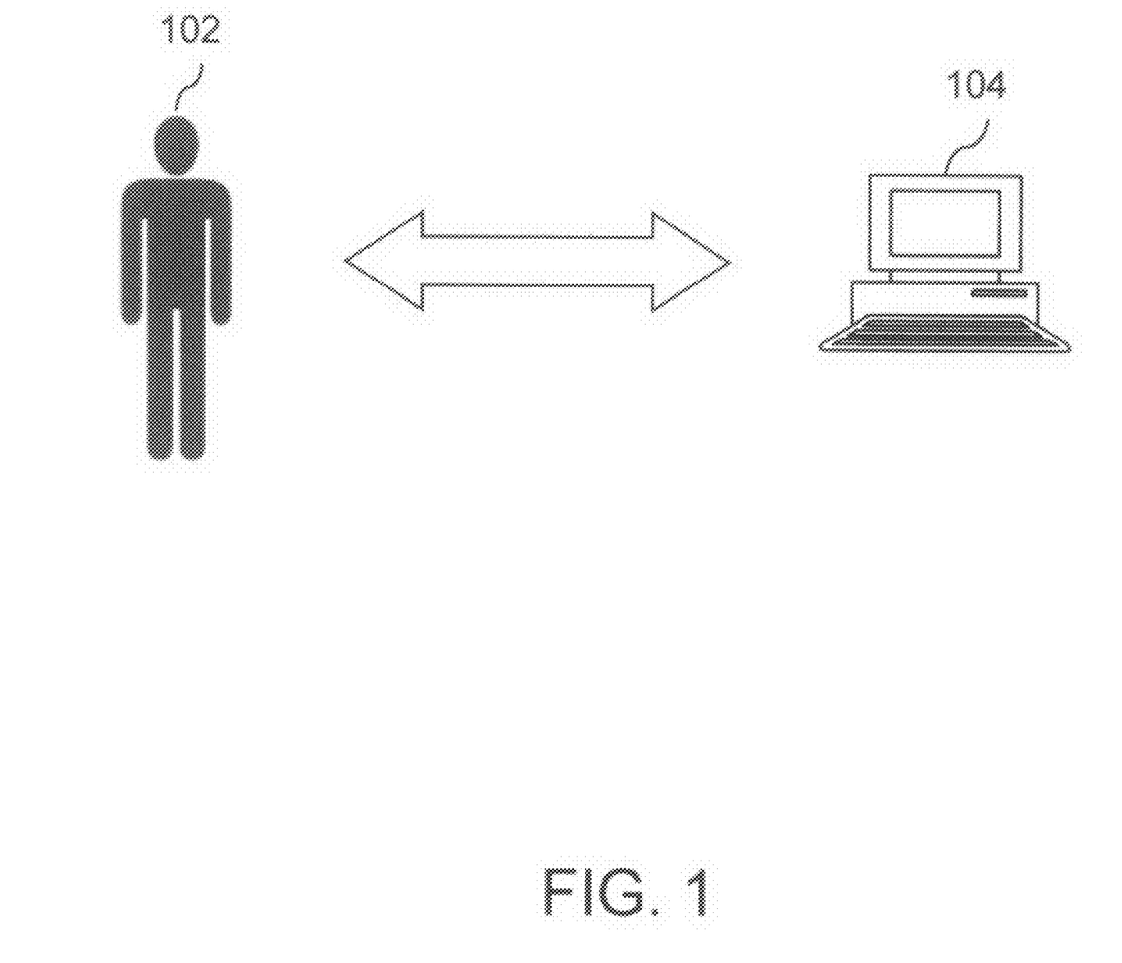
FIG. 1 is an exemplary environment in which the present invention can be practiced, in accordance with an embodiment of the present invention.

FIG. 1 is an exemplary environment in which the present invention can be practiced, in accordance with an embodiment of the present invention. The figure shows a user 102 using a computer 104. User 102 can be an individual home user or a representative of a company. User 102 can perform a variety of tasks using computer 104, such as playing games, surfing the Internet, listening to music, watching movies, purchasing products online from the Internet, designing websites, etc. Computer 104 can also be used to run an application software to create, modify or update content and information, perform application-specific tasks and various other processes. Those skilled in the art will appreciate that the usage of computer 104, as stated above, is only to serve as an example, since the role of computers encompasses all these and a lot more.

In accordance with one embodiment of the invention, user 102 uses computer 104 to create and manage landing pages by using one or more software modules installed on computer 104. The landing pages can be created for a website of a particular product or company. The entire process for creating and managing landing pages will be described in detail in conjunction with the rest of the figures.

Figure 2:
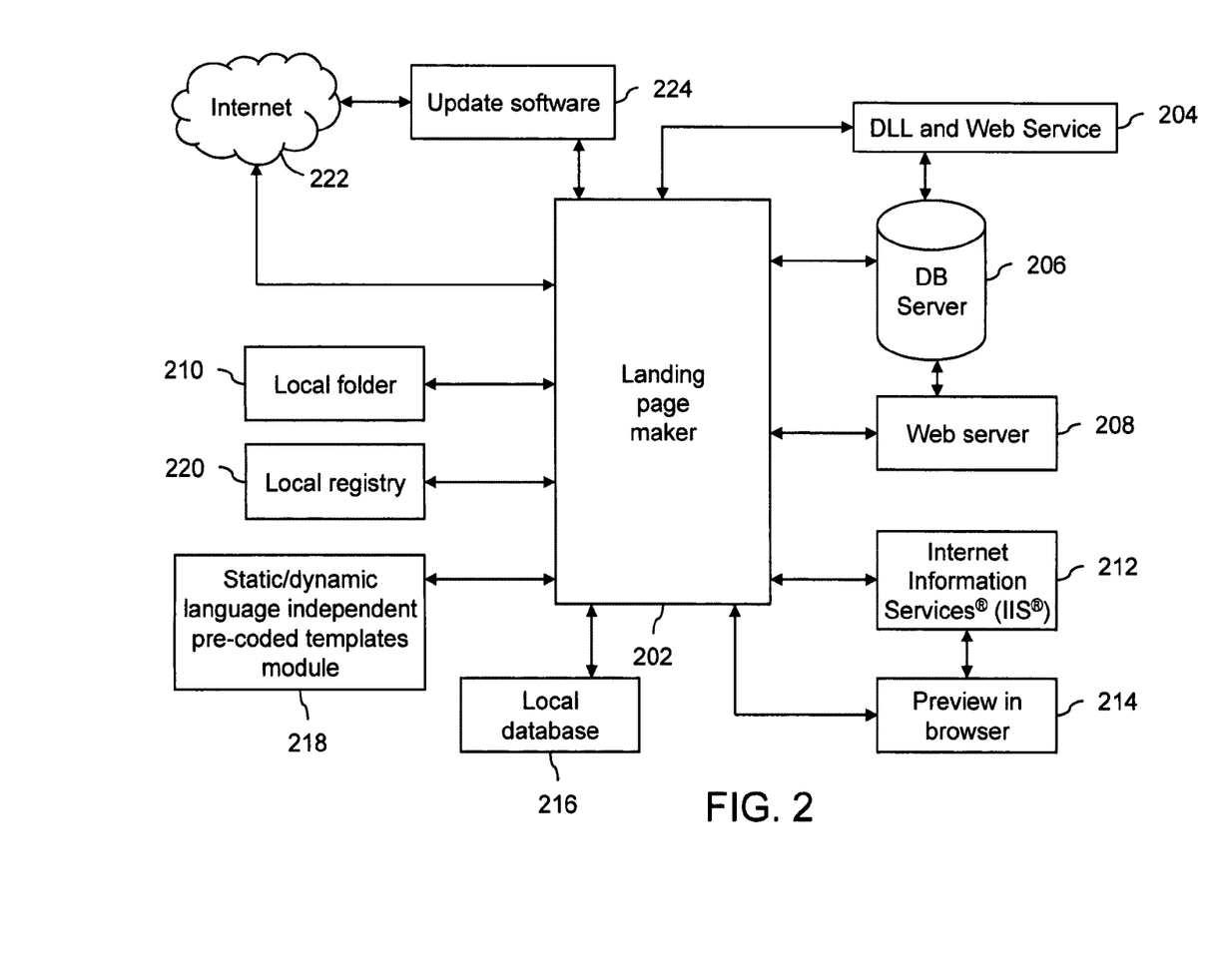
FIG. 2 is a block diagram illustrating a landing page maker and its environment, in accordance with an embodiment of the present invention.

FIG. 2 is a block diagram illustrating a landing page maker 202 and its environment, in accordance with an embodiment of the present invention. Landing page maker 202 can be stand-alone software that can be installed on computer 104 and accessed by user 102. Landing page maker 202 enables user 102 to create and manage one or more landing pages. Landing page maker 202 is shown to be connected to a dynamic link library (DLL) and web service 204. Landing page maker 202 is also connected to a database (DB) server 206 and a web server 208. DLL and web service 204 and DB server 206 are, in turn, connected to each other. Similarly, DB server 206 and web server 208 are connected to each other.

In accordance with one embodiment of the invention, landing page maker 202 enables user 102 to create one or more landing pages for a website, and the content included in the created landing pages is stored in DB server 206. In accordance with one embodiment of the present invention, DB server 206 is the website database which stores all the content regarding the products for which the landing page is created. The content is stored in DB server 206 in the form of database tables. One or more sets of database tables are created with unique names in DB server 206 and are used in configuring landing page maker 202 for a company to store all details regarding landing page maker 202. For example, if a company XYZ installs landing page maker 202 on its office computer, a database table with a unique name will be created for the company XYZ in DB server 206 while landing page maker 202 is configured.

Database tables include, but are not limited to, information about identification of various products (product ID) along with keywords associated with them. These database tables are managed using Structured Query Language (SQL) scripts. SQL is a database computer language that is used for the retrieval and management of content in database servers. Keywords are words that display relevant landing pages or websites when searched for in online search engines. For example, if a user of a search engine searches for the keywords 'Movie theaters in New York', the search engine will display landing pages corresponding to the movie theaters in New York.

As already mentioned, DB server 206 can be a product database or a website database that is used to store all the content used in one or more landing pages. This content may be, for example, product information about various products for which the landing pages are created. The product information includes, but is not limited to, a product ID, keywords associated with the product, etc. For example, if a landing page is used to display information about a screwdriver, a database table in DB server 206 would act as a screwdriver database table. This database table stores the screwdriver ID and keywords for that screwdriver, along with other details pertaining to the screwdriver.

After the creation of the landing page by landing page maker 202, web server 208 enables publishing of the created landing page. The created landing page published using web server 208 can be instantly accessed from the Internet.

Before the created landing page is published by web server 208, the created landing page is coded by using DLL and web service 204. DLL and web service 204 is used to code the created landing pages to enable the display and manipulation of the content stored in DB server 206 dynamically. For example, when user 102 wants to view the created landing page, the content is dynamically retrieved from DB server 206 by DLL and web service 204 and displayed on the created landing page. Further, when user 102 wants to update the created landing page, user 102 only needs to change the content in DB server 206 and the content is updated dynamically on the landing page. For example, if user 102 wants to change the price of one of the products that is displayed on the landing page, user 102 would just have to change the price of the product in DB server 206 and the change will be dynamically reflected in the landing page.

Landing page maker 202 has a local folder 210, which is used for the local storage of one or more created landing pages. In accordance with one embodiment of the invention, local storage implies storing the landing pages on computer 104.

FIG. 2 also shows landing page maker 202 connected to an Internet Information Services® (IIS®) 212. IIS® is a set of Internet-based services for servers that use Microsoft® Windows®. IIS® is the proprietary web server of Microsoft®. Those skilled in the art will appreciate that Internet Information Services® was formerly called Internet Information Server®.

A web server is a computer running a program that can handle HyperText Transfer Protocol (HTTP) requests from web clients, such as web browsers, and serve HTTP responses along with optional data contents. IIS® 212 is configured with a preview in browser 214, which enables previewing of the created landing pages before they are published online using web server 208. Those ordinarily skilled in the art will appreciate that the created landing page can also be previewed without using IIS® 212.

Typically, user 102 uses the preview of the created landing pages to decide whether further changes are needed in the created landing page. User 102 can then publish these created landing pages online using web server 208 or change their content, layout or design, etc.

Landing page maker 202 is also connected to a local database 216, which provides local database support to landing page maker 202. For example, local database 216 stores configuration information pertaining to landing page maker 202. The examples of local database 216 include, but are not limited to, Microsoft® Access®, MySQL®, etc. The configuration information may include details about one or more companies, information about one or more DB servers connected to landing page maker 202, configuration details of the File Transfer Protocol (FTP), configuration details about DLL and web service 204, details pertaining to various templates to be used in creating landing pages, configuration details about the mail server and email, configuration details and access rights of various users who will access landing page maker 202 and details about the database tables. However, product information about the products preferably is not stored in local database 216. This is done so that the usability of the landing pages is not affected if the product information about one or more products needs to be modified. Since product information is stored in DB server 206, it can be directly modified and/or updated in DB server 206 and the changes are automatically reflected in the landing pages which are coded with the product information.

Landing page maker 202 is also connected to a static/dynamic language independent pre-coded templates module 218, which provides various templates that user 102 needs to create landing pages. Static/dynamic language independent pre-coded templates module 218 is used to store several static and dynamic templates locally on computer 104. These templates are used by landing page maker 202 during the creation or editing of landing pages.

Landing page maker 202 is also connected to a local registry 220, which stores the version information of landing page maker 202. For example, landing page maker 202 can be the first version of three or four versions of the landing page maker software.

Landing page maker 202 is also connected to the Internet 222, which enables landing page maker 202 to automatically check for updates to landing page maker 202. These updates include, but are not limited to, service packs for landing page maker 202, updates to one or more modules of landing page maker 202, and version updates of landing page maker 202. Landing page maker 202 does this by comparing the version information of landing page maker 202 stored in local registry 220 with the version information of landing page maker available on the Internet 222. Landing page maker 202 checks for updates on a periodic basis, such as on a monthly, weekly or daily basis. If updates are available for landing page maker 202, update software 224 enables automatic download and installation of the updates to landing page maker 202.

In accordance with one embodiment of the invention, user 102 also can check for software updates directly from landing page maker 202 using an option to check for updates. For example, there can be a dedicated link on landing page maker 202, and user 102 can click on the link to check for the updates of landing page maker 202.

Figure 3:
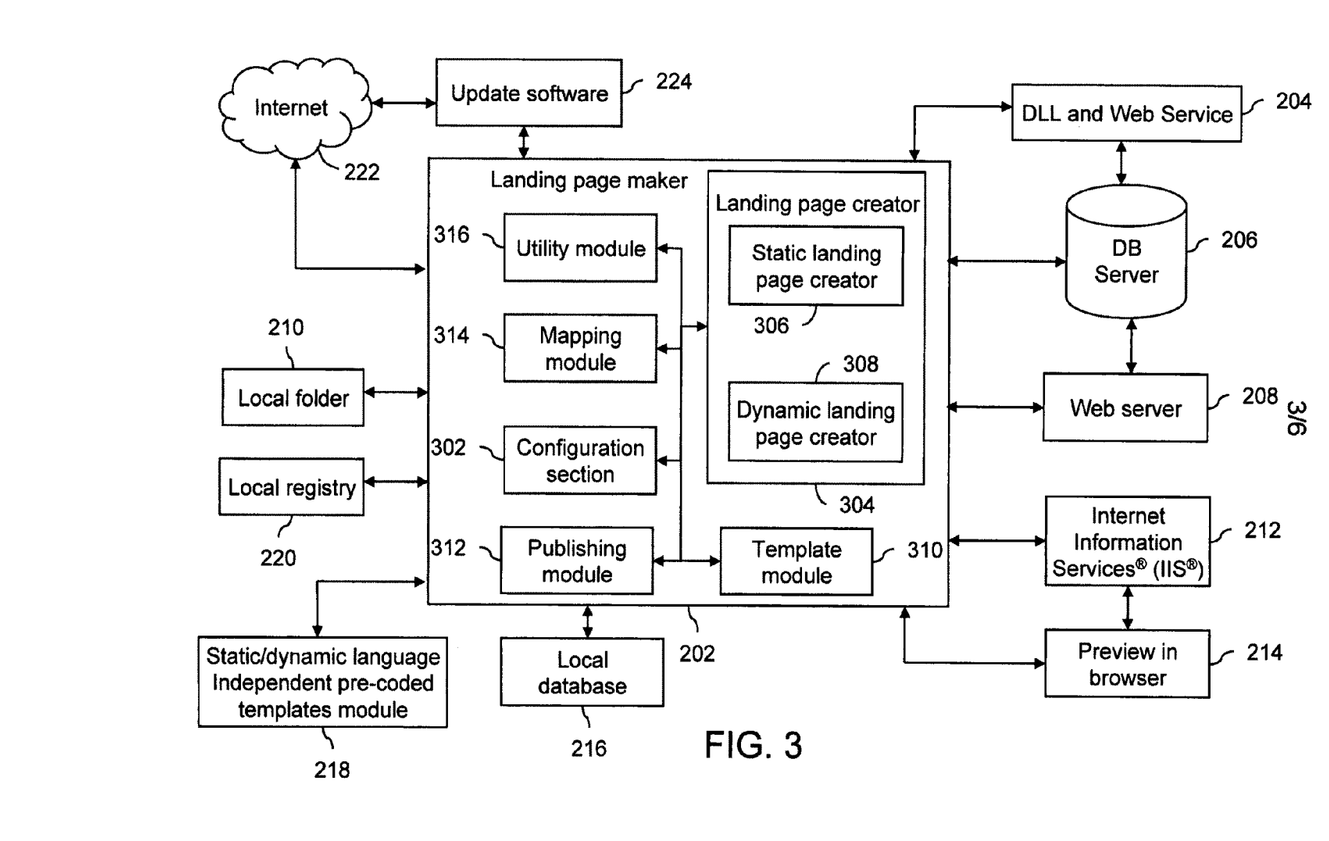
FIG. 3 is a block diagram illustrating various components of the landing page maker, in accordance with an embodiment of the present invention.

FIG. 3 is a block diagram illustrating various components of landing page maker 202, in accordance with an embodiment of the present invention. The various elements of the environment in which landing page maker 202 works have already been explained in conjunction with FIG. 2.

Landing page maker 202 includes a configuration section 302, which stores and keeps track of configuration information pertaining to landing page maker 202. This is the core section of landing page maker 202 and stores basic information, such as company information, information about one or more DB servers connected to landing page maker 202, campaign detail information about the landing pages such as Uniform Resource Locator (URL) details and tracking codes for the landing pages, File Transfer Protocol (FTP) or the web service details about the web server where the landing pages are published, configuration details about DLL and web service 204, details and configuration information pertaining to various templates to be used in the creation of landing pages, the landing page type to be used by the company, for example, static or dynamic landing page, configuration details of mail server and email, configuration details and access rights of various users who will access landing page maker 202, details about the database tables, user and login details to landing page maker 202, and the Post Office Protocol version 3 (POP3) account details to send mails to user 102 of landing page maker 202. Those skilled in the art will appreciate that the types of information stored and tracked by configuration section 302, as mentioned above, are exemplary in nature and may include more or fewer types of information.

In accordance with one embodiment of the invention, configuration section 302 can be connected to local database 216 and the configuration information is stored in local database 216. Configuration section 302 keeps track of this configuration information, retrieves it from local database 216 and provides it to other modules of landing page maker 202, when requested. It should be noted that the local database 216 preferably does not store any information relating to products for which the landing page is created. The said product information preferably is stored in DB server 206 only.

Landing page maker 202 also includes a landing page creator 304, which is used to create, edit, delete or modify one or more landing pages. Landing page creator 304 includes a static landing page creator 306 and a dynamic landing page creator 308. Static landing page creator 306 enables user 102 to create static landing pages using landing page maker 202. Landing pages that do not require any database connectivity and contain only HyperText Markup Language (HTML) content and simple text and images are known as static landing pages. For example, a simple landing page or web page that has only text and a few images, and is not connected to any website database such as DB server 206, can be a static landing page. To create a static landing page, static landing page creator 306 uses a selected template of the static type that is stored in a template module 310. The template is selected by user 102 according to his/her requirements.

After an appropriate template is selected by user 102, the data to be included in the landing page is input by user 102 in landing page maker 202. Static landing page creator 306 uses the data input by user 102 and the selected template to create a static landing page. In accordance with one embodiment of the invention, the data input by user 102 that is used to create the static landing page is stored in DB server 206. The data is stored for later modification and editing of the created static landing page. In accordance with one embodiment of the invention, the content used for creating the static landing page is stored for future editing purpose of the static landing page. In other words, the content is not stored for the display of the static landing page, but for future modification of the static landing page.

As mentioned above, landing page creator 304 also includes dynamic landing page creator 308. Dynamic landing page creator 308 enables user 102 to create dynamic landing pages using landing page maker 202. Landing pages that require content, such as text, images, videos, products of websites or other details apart from HTML content, to be retrieved dynamically from DB server 206 are known as dynamic landing pages. For example, any landing page or web page that displays graphic images and video content and uses website database connectivity, i.e. DB server 206, for the storage and retrieval of the images and videos is known as a dynamic landing page. Similar to static landing page creator 306, dynamic landing page creator 308 uses the selected templates of the dynamic type and the data input by user 102 to create a dynamic landing page. The content used to create the dynamic landing page is stored in local folder 210 or DB server 206 for later use in the case of editing or re-creating of the landing page. Further, dynamic landing page creator 308 uses DLL and web service 204 to dynamically connect landing page maker 202 with DB server 206. Dynamic landing page creator 308 also uses Active Server Pages (ASP) or Active Server Pages dot Net (ASP.NET) or Hypertext Preprocessor (PHP) or JavaServer Pages (JSP) or their combination to create and display dynamic content on the created landing page.

Landing page maker 202 also allows user 102 to make a copy of the created landing page and modify its content to easily create a new landing page. For example, if user 102 wants to quickly create a new landing page, user 102 can do so by using landing page maker 202 to make a copy of an existing landing page and modify its content to create the new landing page. User 102 can retain the pre-coded template used in the existing landing page to create the new landing page.

In accordance with one embodiment of the present invention, dynamic landing page creator 308 is used to copy and create a new dynamic landing page, and static landing page creator 306 is used to copy and create a new static landing page.

Additionally, landing page creator 304 enables editing of one or more landing pages created by user 102. Static landing page creator 306 is used to edit the previously created static landing page, and dynamic landing page creator 308 is used to edit the previously created dynamic landing page. After the landing page has been edited by user 102, landing page creator 304 re-creates the landing page and also enables user 102 to preview the edited landing page before saving it in local folder 210 or publishing it online using web server 208. User 102 can also choose not to preview the edited landing page and directly publish it online or save it locally using local folder 210. For example, if user 102 wants to edit a created landing page, user 102 will need to select the landing page to be edited and use the edit option of landing page maker 202 to edit it. User 102 can edit the landing page to change the template used in it or modify its content, or both. After editing the required landing page, user 102 can save it in a local folder, immediately publish it online, or preview it before publishing it. User 102 can also change the keywords for a particular landing page.

To change a dynamic landing page, landing page maker 202 allows user 102 to modify the content stored in DB server 206. The content includes, but is not limited to, product information relating to a company. This product information is not stored in local folder 210. When the content stored in DB server 206 is modified, the modifications automatically reflect in the landing pages which were coded with that content. For example, user 102 had created a landing page with product information 'A'. Now, if the user 102 modifies the product information to 'B', this change is automatically reflected in the created landing page when anyone views it online.

In accordance with one embodiment of the invention, landing page creator 304 is connected to template module 310. This enables static landing page creator 306 and dynamic landing page creator 308 to access template module 310. Template module 310 is used to access various static and dynamic pre-coded templates. These static and dynamic pre-coded templates are stored locally using static/dynamic language independent pre-coded templates module 218. The static and dynamic templates can be pre-coded with custom headers and footers and custom design details. Additionally, static and dynamic templates are pre-coded on the basis of the requirements of each company pertaining to the type of landing pages it wants to use. Template module 310 also enables the configuration of the static and dynamic pre-coded templates with a unique name or identification, or both. For example, when user 102 is creating a static landing page using landing page maker 202, template module 310 provides an option to user 102 to select a template from several available pre-coded static templates. User 102 can select a template to create a static landing page. If user 102 wants to create a dynamic landing page, user 102 will again get the option to select a template from several available templates. User 102 can select a template and then add images, videos, text and products from DB server 206 using DLL and web service 204 to create a dynamic landing page.

In accordance with one embodiment of the invention, template module 310 can also be used by user 102 to send a request to a dedicated service provider for a new template to be included in landing page maker 202. On receiving the request, the dedicated service provider creates and customizes a new template according to the request submitted by user 102. In an exemplary scenario, the dedicated service provider may an entity responsible for customizing templates according to a company's or an individual's requirement.

Landing page maker 202 includes a publishing module 312. Publishing module 312 enables user 102 to publish the created landing pages on the Internet by using web server 208. For example, if user 102 wants to publish the created landing page online, user 102 will need to use the 'publish' option in landing page maker 202. Thereafter, publishing module 312 will check if the FTP details are present in the configuration information of configuration section 302. If the FTP details are present, publishing module 312 will make a request to web server 208 to publish the created landing page online. If the FTP details are not present, publishing of the created landing page will generally not be possible. However, user 102 will be able to save the created landing page in local folder 210.

A mapping module 314 is also included in landing page maker 202. Mapping module 314 is used to create and map one or more keywords with each landing page or a group of landing pages created or modified using landing page creator 304. Mapping module 314 is also used to manage keywords, keyword groups, keyword variations, etc. Mapping module 314 also enables search engine optimization of the created landing pages in conjunction with one or more keywords in such a manner that the created landing page appears in the list of search results when a search is performed using these keywords. For example, let us consider that user 102 created a landing page to sell mobile phones, and wants the created landing page to be displayed as a result when a user searches for "mobile phones" in an online search engine, such as Google® or Yahoo® To accomplish this, user 102 will use the mapping option of landing page maker 202 to map the created landing page with various keywords, for example, "mobile", "phones", "mobile phones", etc., to the end that when anybody uses the aforementioned keywords in the online search engine, the landing page he created should come up in their list of search results. When user 102 inputs a plurality of keywords corresponding to a created landing page, mapping module 314 maps the keywords with the created landing page and stores the information relating to the mapped keywords and the landing page in DB server 206.

Mapping module 314 can also be used to map a keyword or a landing page in an ad group or campaign. Conversely, mapping module 314 can map an ad group or campaign to a landing page.

Additionally, mapping module 314 also provides an import and export option to import or export the keywords mapped landing pages to and from Google®, Yahoo®, MSN® or other ad-word programs.

Mapping module 314 also provides an option to block the created landing page from being indexed by Google®, Yahoo®, MSN® or other search engines. This is useful since the crawling bots of Google®, Yahoo®, MSN® or other search engines may block one or more landing pages if they detect that these landing pages have near similar content with almost negligible difference and are being used to boost the Google® PageRank® ranking of the page. To avoid such a scenario, mapping module 314 of landing page maker 202 allows user 102 to block one or more landing pages from being indexed by Google®, Yahoo®, MSN® or other search engines.

Landing page maker 202 also includes a utility module 316. Utility module 316 stores and maintains complete user management functionality such as assigning and managing user roles and access rights associated with the handling of multiple companies in landing page maker 202. For example, user roles and access rights may be the rights assigned to user 102 whereby user 102 can access the content, configuration information and settings pertaining to one company and to restrict user 102 from using or accessing content relating to other companies. User roles and access rights also seek to grant or revoke user 102 the access privileges to edit and/or delete one or more landing pages or a group of landing pages. Utility module 316 also provides control settings for all the landing pages created or accessed using landing page maker 202. For example, some landing pages can be restricted from modifications by certain users. Additionally, utility module 316 also provides user tracking management which keeps track of all the users visiting each of the created landing pages and their activities. This activity includes the number of times the created landing pages were accessed and the number of visitors who bought the products advertised on a particular landing page, the landing pages that were viewed the maximum number of times in comparison with other landing pages, or whether there were any click frauds, etc. For example, user 102 can use the utility option of landing page maker 202 to display all the details and statistics about the Internet traffic on the created landing pages. User 102 can determine the number of visitors on the created landing pages, the number of visitors who placed an order for a particular product, and the landing pages that had the maximum visitors, etc, by clicking on the appropriate links on the landing pages.

Utility module 316 can also be used to send an email to the email address specified by user 102. For this purpose, utility module 316 first sends a request to configuration section 302 to determine whether mail server details and email details are present. If these details are present, utility module 316 uses these details to send an email to the email address specified by user 102. This email can be a one-time email or a periodic email according to the option selected by user 102. The email will contain the statistics related to the tracking function of utility module 316, as described above. For example, if user 102 wants to receive a periodic email containing the visitor statistics for one or more created landing pages, user 102 can select the landing pages or groups of landing pages and then configure the send email option to receive periodic emails containing daily or weekly or monthly visitor statistics for the selected landing pages or groups of landing pages.

Figure 4:
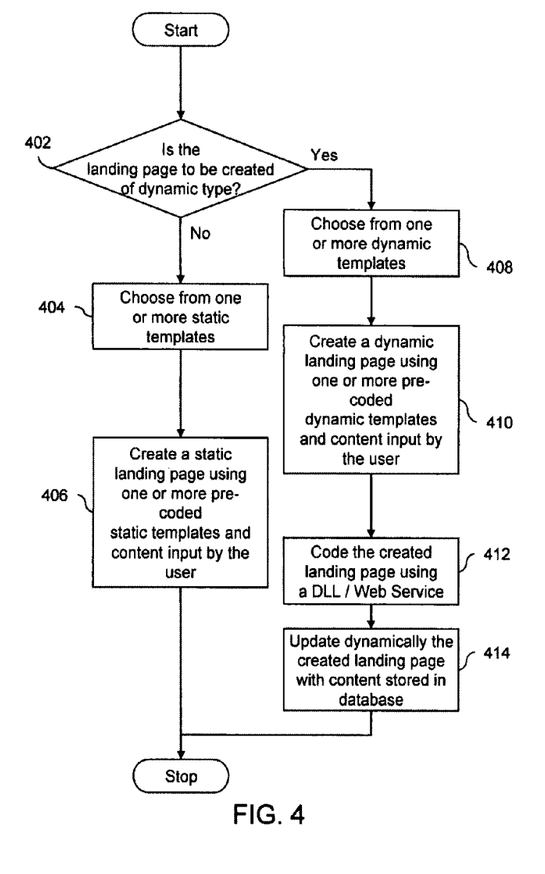
FIG. 4 is a flowchart illustrating the steps for creating a landing page, in accordance with an embodiment of the present invention.

FIG. 4 is a flowchart illustrating the steps for creating a landing page, in accordance with an embodiment of the present invention. At step 402, user 102 is given an option to choose between creating a static landing page or a dynamic landing page. If user 102 opts for a static landing page, then, at step 404, user 102 gets to choose from various available pre-coded static templates to be used to create a landing page. Typically, the templates shown to user 102 are first coded using the information provided by user 102 or a company, and are customized according to the requirements. For example, user 102 can specify a particular header or footer for the template, a particular font for the template, etc. These coded templates are then stored in DB server 206 for later retrieval.

When user 102 opts for a static landing page, a plurality of pre-coded templates is displayed. User 102 can select one of these templates to continue creating the landing page. In accordance with one embodiment of the invention, along with selecting an appropriate template to create a static landing page, user 102 also inputs the content to be included in the static landing page. The content can be, for example, the price of the product that user 102 wants to advertise, the font of the text on the landing page, etc.

When user 102 selects an appropriate static pre-coded landing page template and inputs the content for the landing page, then, at step 406, a static landing page is created by landing page maker 202. For example, let us consider that user 102 wants to create a static landing page. User 102 is given an option by landing page maker 202 to choose between creating a static landing page and a dynamic landing page. User 102 selects the static landing page option, since he wants to create a static landing page. Then, user 102 gets a list of all the available pre-coded static templates and selects a particular template. Thereafter, user 102 inputs the content for the landing page and, subsequently, landing page maker 202 creates a static landing page using the selected pre-coded static template and the content input by user 102.

Alternatively, if at step 402, user 102 opts to create a dynamic landing page, then, at step 408, user 102 gets to choose from various pre-coded dynamic templates to create a landing page. User 102 can then select one of the pre-coded dynamic templates to continue creating the landing page. Thereafter, user 102 inputs the content for the dynamic landing page. Then, at step 410, a dynamic landing page is created by landing page maker 202 using the dynamic pre-coded template selected by user 102 and the content input by user 102. At step 412, the created dynamic landing page is coded by using DLL and web service 204. The process of coding the landing page by using DLL and web service 204 has already been explained in conjunction with FIGS. 2 and 3. At step 414, the created dynamic landing page is dynamically updated with the content stored in DB server 206. For example, if user 102 wants to create a dynamic landing page, he first gets the option to choose from the various available pre-coded dynamic templates to create a dynamic landing page. When user 102 selects a template, a dynamic landing page coded by using DLL and web service 204 is created using the selected template. User 102 can then update the created dynamic landing page with dynamic content, such as text, products information, images, videos or animations stored in DB server 206, by using DLL and web service 204 provided by landing page maker 202.

Figure 5:
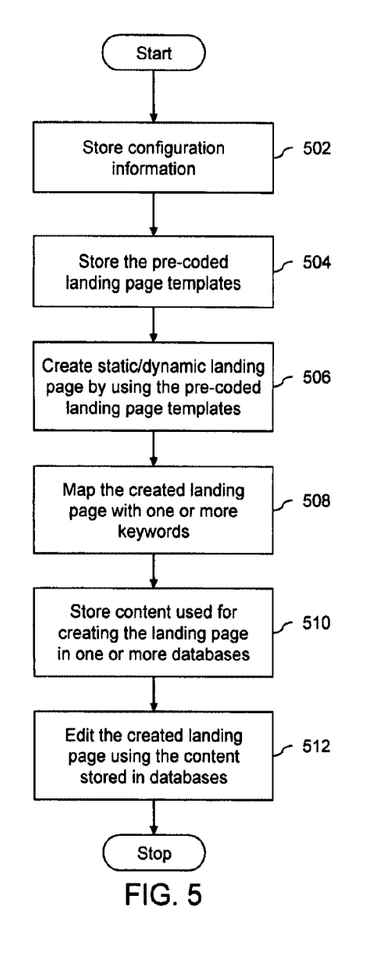
FIG. 5 is a flowchart illustrating the steps for managing the landing page, in accordance with an embodiment of the present invention.

FIG. 5 is a flowchart illustrating the steps for managing the landing page, in accordance with an embodiment of the present invention. As explained in conjunction with FIGS. 2 and 3, landing page maker 202 is used to create and manage landing pages or groups of landing pages.

At step 502, all the configuration information pertaining to the operation of landing page maker 202 is stored in local database 216. The configuration information includes, but is not limited to, the details about one or more companies, information about one or more DB servers connected to landing page maker 202, configuration details of the File Transfer Protocol (FTP), configuration details about DLL and web service 204, details pertaining to the various templates to be used in the creation of landing pages, configuration details of the mail server and email, configuration details and access rights of the various users who can access landing page maker 202, and the details of the database tables. The details about one or more companies are desirable to customize landing page maker 202 to suit the requirements of each company that purchases landing page maker 202. For example, a company that manufactures 'towels' will have information relating to the company such as company name, company address, etc.

Further, the configuration information about the various templates is useful in the creation of both static and dynamic landing pages. The information regarding the various templates can be, for example, the different types of templates, the location of the folder where the different templates are stored, etc. The information about the DB servers is desirable to retrieve and update the content stored on those DB servers. The configuration details about DLL and web service 204 are desirable in the coding of the created landing pages to display dynamic content from the DB servers. The details about the keywords help mapping module 314 in mapping one or more keywords with landing pages or groups of landing pages. The FTP details are desirable if user 102 wants to publish the created landing pages online.

Those skilled in the art will appreciate that the types of information stored in configuration section 302, as mentioned above, are exemplary in nature and may include more or fewer types of information.

At step 504, all the pre-coded landing page templates to be used to create landing pages are stored in static/dynamic language independent pre-coded templates module 218. The pre-coded landing page templates include both pre-coded static templates as well as pre-coded dynamic templates. In accordance with one embodiment, prior to storing the pre-coded templates, the templates are coded by using user specified information. The user specified information can be, for example, a unique name of the company of the user or a user name itself, user identification (like his initials), images, videos, color theme, a header and footer on the templates, etc.

At step 506, a static or a dynamic landing page is created by using either the static landing page template or the dynamic landing page template. The landing page is selected on the basis of the requirements of user 102 using landing page maker 202. For example, if user 102 wants to create a static landing page, user 102 can select a static landing page template. In contrast, if user 102 wants to create a dynamic landing page, user 102 can select a dynamic landing page template. In accordance with one embodiment of the invention, user 102 gets to choose from various available pre-coded templates when he creates a landing page. This choice is applicable to both static as well as dynamic landing pages.

At step 508, the created landing page is mapped with one or more keywords. In accordance with one embodiment, user 102 is given an option after creation of the landing page to map the created landing page with one or more keywords. This is done for search engine optimization of the created landing page so that when a search is performed using the keywords corresponding to the created landing page, it should be among the list of results for that search. For example, let us consider a scenario where user 102 creates a landing page to sell screwdrivers and wants the created landing page to come up as a result if user 102 searches for "screwdrivers" in an online search engine, such as Google® or Yahoo® search. User 102 will use the mapping option of landing page maker 202 to map the created landing page with various keywords, for example, "screw", "screwdriver", etc., to the end that when someone uses these keywords in the online search engine, the created landing page should come up in their list of search results.

At step 510, the content used for the creation of a landing page is stored in DB server 206. This is done so as to facilitate easy retrieval and access of the content from DB server 206 using DLL and web service 204 when required by user 102 who created the landing page. This becomes important when user 102 wants to edit the created page or to update the content dynamically on the landing page. Typically, when user 102 creates a dynamic landing page, user 102 codes the created dynamic landing page with DLL and web service 204 to enable dynamic retrieval and access of the content and products stored in DB server 206. For example, if user 102 wants to update a landing page with dynamic content, user 102 can use landing page maker 202 to store the content in DB server 206 and can use DLL and web service 204 to code the landing pages with the stored content and dynamically retrieved products from DB server 206. When somebody wants to view the created landing page, the content and product information are dynamically retrieved from DB server 206 using DLL and web service 204 and displayed accordingly in the dynamic landing page. Therefore, to change the content of a landing page, user 102 only needs to change the content in DB server 206 and this change will be automatically reflected the next time someone clicks on the dynamic landing page to view it.

At step 512, the created landing page is edited by using content stored in DB server 206. Editing can be done to either change the template being used for the landing page or to change the content of the landing page, or both. To edit a dynamic landing page, user 102 needs to change the content stored in DB server 206 and this change will be automatically reflected in the dynamic landing page. For example, consider a scenario where user 102 has created a static landing page and a dynamic landing page. User 102 wants to edit the content of both the landing pages. In the case of the static landing page, landing pager maker 202 will make use of static landing page creator 306 to modify the content of the static landing page. After the content has been modified, the static landing page is re-created and an option to preview the landing page is provided to user 102. Thereafter, either the static landing page is saved in local folder 210 or published online using web server 208. In the case of a dynamic landing page, landing page maker 202 uses dynamic landing page creator 308 to modify the content of the dynamic landing page stored in DB server 206. The changed content is dynamically reflected in the landing page.

In accordance with one embodiment of the present invention, the editing option of landing page maker 202 is also used to create a new landing page. To this end, user 102 copies an existing landing page and edits the content of the existing landing page to create a new landing page. In this case, the newly created landing page has the same template as the existing landing page.

Figure 6:
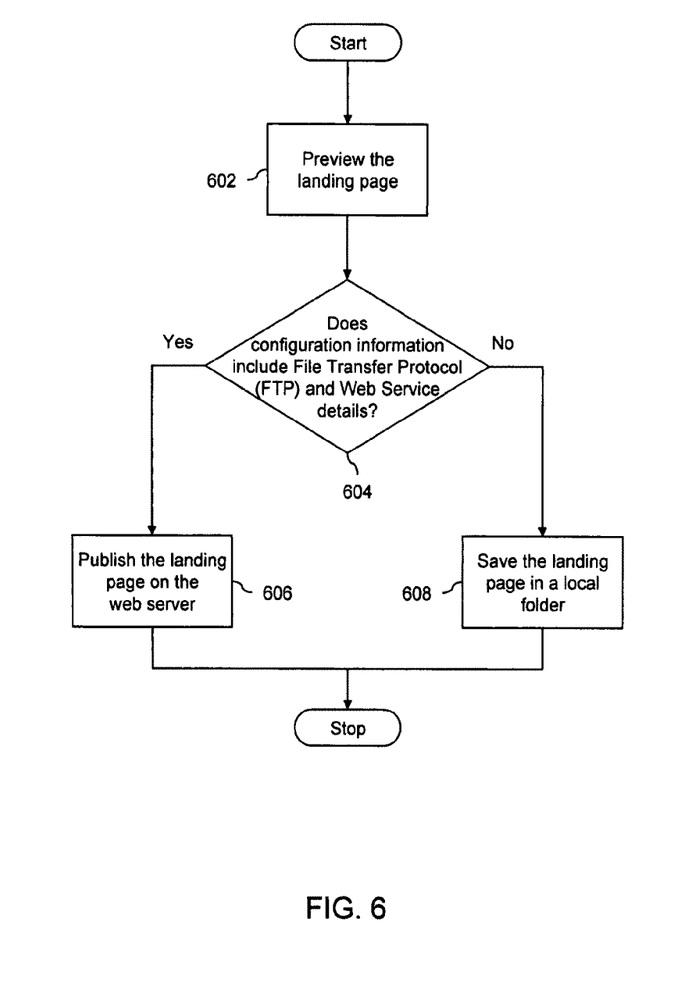
FIG. 6 is a flowchart illustrating a method for previewing and publishing the landing page, in accordance with another embodiment of the present invention.

FIG. 6 illustrates a flowchart of a method for previewing and publishing the landing page, in accordance with an embodiment of the present invention. As mentioned above, landing page maker 202 is used to create and manage landing pages or groups of landing pages.

At step 602, the landing page can be previewed using the preview option of landing page maker 202. If the landing page to be previewed is a static landing page, it can be simply previewed in a web browser. A web browser is software that is generally pre-installed in the operating system of a computer and enables viewing of websites or landing pages. If the landing page to be previewed is a dynamic landing page, it can be previewed using Internet Information Services® (IIS®) 212 and preview in browser 214. If IIS® 212 is configured for landing page maker 202, then the dynamic landing page is temporarily deployed in local folder 210 and can be previewed in the web browser of computer 104 using preview in browser 214. Alternately, the dynamic landing page can also be previewed without using IIS® 212.

At step 604, it is determined whether the configuration information stored in configuration section 302 includes the FTP details and the web service details. If both FTP details and web service details are present, then, at step 606, the landing page is published on the Internet using web server 208. For example, if user 102 wants to publish the created landing page online, landing page maker 202 first checks if it includes the necessary FTP details and web service details. If the requisite details are present, landing page maker 202 enables publishing of the created landing page on web server 208.

However, if at step 604, it is determined that the configuration information does not include FTP details and web service details, then, at step 608, the landing page is saved in local folder 210.

In the example, if user 102 wants to save the created landing page, user 102 can do so by saving the created landing page in local folder 210 for easy retrieval and access, and uploading the landing page later.

In accordance with an embodiment, the present invention can be used by a home user to create or manage landing pages. The home user can use the landing page maker to create one or more landing pages to derive commercial profit from it by advertising products using the landing page maker or for non-commercial use, such as research in the field of online search engines, ad-word programs and associated landing pages.

Similarly, the present invention can be used by a representative user of a company to manage landing pages. The representative user can use the landing page maker to create and manage one or more landing pages to derive commercial profit from it by using the created landing pages to advertise and sell products or services online. This can be easily achieved, since the landing pages created using the landing page maker are optimized for search engines. Therefore, the company can look forward to using this medium to sell its products or services online or to receive orders for the shipment of its products or services online.

Various embodiments of the present invention relate to a method, a system and a computer program product for creating and managing landing pages. Such a method, a system and a computer program product eliminates the need for full-time skilled web designers or third-party web designing companies to create and manage landing pages. It also eliminates the need to avail the services of remotely located websites that provide the facility of creating landing pages. A regular computer user can directly create and administer professional-looking landing pages and need not require any code or design experience to be able to do so. Further, the present invention provides stand-alone software that can be installed on the computer of a user, thereby reducing the effort required to create and host a landing page.

The system, as described in the present invention, or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The computer system comprises a computer, an input device, and a display unit. The computer comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and the like. Furthermore, the storage device can be other similar means for loading computer programs or other instructions on the computer system.

To process input data, the computer system executes a set of instructions that are stored in one or more storage elements. The storage elements may also store data or other information, as desired, and may be an information source or physical memory element present in the processing machine.

The set of instructions may include various commands that instruct the processing machine to perform specific tasks such as the steps constituting the method of the present invention. The set of instructions may be in the form of a software program. The software may be in various forms such as system or application software. The software may also be in the form of a collection of separate programs, a program module with a larger program, or a portion of a program module. Further, the software may include modular programming in the form of object-oriented programming. Processing of input data by the processing machine may be in response to user commands or to the results of previous processing.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for creating a web site landing page, the method comprising the steps of:
  providing:
    a landing page maker program:
      stored on non-transitory memory, operable on a computer by a user without the need to use remotely located websites that provide the facility of creating landing pages;
      the landing page maker program comprising: a utility module; a mapping module; a publishing module; and a template module; and
    a dynamic link library and web service;
  connecting the dynamic link library and web service to a web server and a database server;

the landing page maker program when operated on the computer implements steps, the steps comprising:

connecting to a pre-coded template in the template module;

connecting to a local database on the computer for access and storage of configuration information for the landing page maker program, said connecting using the utility module;

enabling the user to add content to the pre-coded template to form the web site landing page, said landing page coded for using the dynamic link library and web service;

storing on the database server said content to the pre-coded template;

creating keywords for the web site landing page using the mapping module;

displaying the web site landing page on the computer by dynamically retrieving said content from the database server;

publishing the web site landing page on the web server using the publishing module;

updating dynamically the created landing page with a content stored in one or more databases.

2. The method as recited in claim 1 further comprising:
making a copy of the created landing page; and
modifying the content of the copy of the created landing page to create a new landing page.

3. The method as recited in claim 1, wherein the configuration information comprises at least one of a company detail, a one or more databases detail, a File Transfer Protocol (FTP) detail, a Web Service detail, a template detail, a campaign detail, a plurality of email details, a plurality of user details and a database table detail.

4. The method as recited in claim 1, wherein the landing page maker program when operated on the computer further implements a step of coding one or more templates by using a user specified information.

5. The method as recited in claim 4, wherein the user specified information comprises at least one of a unique name, a user identification, a header and a footer.

6. The method as recited in claim 1, wherein the landing page maker program when operated on the computer further implements a step of tracking a plurality of users accessing the landing page.

7. The method as recited in claim 1, wherein the landing page maker program when operated on the computer further implements a step of assigning user roles, wherein the user roles are assigned to define access rights for at least one user of a plurality of users.

8. The method as recited in claim 7, wherein the user roles comprise at least one of an editing and a deletion of the created landing page.

9. A system for managing a plurality of landing pages, the system comprising:
a landing page maker:
a dynamic link library and web service;
a data base server;
a web server;
a local folder;
a connection to the Internet;
the landing page maker comprising computer executable code packaged in modules and operable on a computer by a user without the need to use remotely located websites that provide the facility of creating landing pages, the modules comprising:
a utility module configured to:
store and maintain user management functionality;
store control settings for the plurality of landing pages;
provide user tracking management to keep track of users visiting each of the plurality of landing pages;
send an email via the connection to the Internet if mail server details are present, the email comprising statistics relating to user tracking management;
a mapping module configured to:
create keywords with each landing page;
map a keyword or a landing page in an ad group or campaign;
import or export the keywords mapped in landing pages to and from ad-words programs;
block the landing page from being indexed by a search engine;
a publishing module configured to enable a user to publish the landing pages on the Internet by using the web server if file transfer protocol details are present;
a static landing page creator configured to create a landing page that is not connected to any website database;
a dynamic landing page creator configured to:
create a landing page that includes content, apart from hypertext markup language content, to be retrieved dynamically from the data base server or from the local folder;
use the dynamic link library and web service to dynamically connect the landing page maker with the data base server;
a template module configured to access static and dynamic pre-coded templates;
the landing page maker program is configured to create a landing page by using a pre-coded template accessed from the template module; and
the landing page maker program is further configured to update dynamically the created landing page with a content stored on the data base server; and
a configuration section configured to code the landing page by using the dynamic link library and web service.

10. The system as recited in claim 9, wherein the landing page maker is further configured to: make a copy of the created landing page; and modify the content of the copy of the created landing page to create a new landing page.

* * * * *